United States Patent [19]
Krause et al.

[11] Patent Number: 6,051,262
[45] Date of Patent: Apr. 18, 2000

[54] CEREAL HAVING A FUNCTIONAL SURFACE COATING

[76] Inventors: Arthur A. Krause, 20539 Archwood St., Winnetka, Calif. 91306; Walter K. Lim, 14720 Horticultural Dr., Hacienda Heights, Calif. 91745

[21] Appl. No.: 09/123,189

[22] Filed: Jul. 27, 1998

[51] Int. Cl.[7] .......................... A21D 13/00; A21L 1/216
[52] U.S. Cl. ..................... 426/94; 426/96; 426/619; 426/620; 426/621
[58] Field of Search ............... 426/94, 619, 620, 426/621, 96

[56] References Cited

U.S. PATENT DOCUMENTS

| | | | |
|---|---|---|---|
| 3,582,336 | 6/1971 | Rasmusson | 426/293 |
| 4,089,984 | 5/1978 | Gilbertson | 426/293 |
| 5,027,980 | 7/1991 | Bell | 222/94 |
| 5,894,027 | 4/1999 | Kazemzadeh | 426/94 |

OTHER PUBLICATIONS

"Building a Better Breakfast"; Food Product Design; Apr. 1998. Lynn A. Kuntz.

"More Than Just Milk"; Food Product Design; Jan. 1998. Kimberlee J. Burrington.

"Bowl 'Em Over: Adding Value To Breakfast Cereal" Food Product Design; Jun. 1997. Elaine Kuehr.

"Mastering The Morning: Creating Breakfast Cereals"; Food Product Design; Jun. 1995. Scott Hegenbart.

"Kraft Non–Fat Dry Milk Alternates" Kraft Food Ingredients. Undated.

*Primary Examiner*—Nina Bhat
*Attorney, Agent, or Firm*—Page Lohr Associates

[57] ABSTRACT

Articles of the invention include cereal food products prepared in their manufacture processes with a specialized surface coating which operates to make a cereal product which can be easily mixed with water only to yield a good tasting product. A coating of milk or milk-like substance applied to the surface of cereal pieces may be mixed with water. The result is cereal in a liquid substance of reconstituted milk or substance which resembles milk. The mixture of cereals of the invention and water substitute for the common combination of cereal and real milk.

22 Claims, No Drawings

6,051,262

CEREAL HAVING A FUNCTIONAL SURFACE COATING

BACKGROUND OF THE INVENTION

1. Field

The following invention disclosure is generally concerned with cereal food products and specifically concerned with cereals having a coating of milk or milk-like material on the exterior.

2. Prior Art

One need not go further than the breakfast table to discover the state of the art. Sugar frosted flakes and Mueslix or similar cereals may be found in the cupboards of most American homes. These cereal products are representative of the latest in breakfast technologies and trends.

A sophisticated publication, "Food Products Design" published by Weeks Publishing Company of Northbrook Illinois illustrates well the great efforts applied to advancing food product technologies in general and breakfast products specifically. In particular, the April 1998 issue directed primarily to "Building Better Breakfast Cereals" sets forth the benchmark and state of the art.

Additionally, the July 1995 issue of the same journal presents a very comprehensive presentation relative to creating breakfast cereals. Specifically, a good discussion given relates to coating processes including sugar surface coatings.

Still further, the June 1997 issue of the same publication teaches new techniques relating to cereals. Attention is directed to the section titled "Sweet awakenings" where discussion relating to surface application of sugars which enhance not only taste, but also improve functionality of the cereal pieces. Description of applying honey in a liquid state is also included in the article.

Still further the discussion includes application of flavorings to the surfaces of cereal pieces. Further, the article teaches how colorants may be applied to coatings.

However, neither of these leading teachings present a case nor suggestion for how milk may be applied to surfaces of cereal pieces.

Kraft, a leading food products manufacture publishes and distributes a guide to uses and applications of milk and milk alternate products. A matrix of products and uses appears as tables titled "Multi purpose Non-Fat Dry Milk Alternates" and "Specialty Non-Fat Dry Milk Alternates". This teaching suggests uses for dry milk products in foods including at least: cakes, sauces, gravies, pies, donuts, breads, cream pies, icings, rolls, yeast raised products, buttermilk flavor bread, pancake mixes, confections, compound coatings for candies, cookies, cream filling for candies, granulated potato products, flow agent for mixes, high fat level products, among others. However, these milk products are in no way associated with cereals and the production of cereal products.

An excellent presentation relating to milk and milk products and their advanced uses is contained in Food Product Design, January 1998. Although the people at Food Products Design represent leading experts in the cereal product design as evidenced by their well recognized and leading contributions to that field mentioned previously, the article fails to draw any connection to uses of milk and milk products in cereals as will be discussed in detail in the disclosure herefollowing.

It is an old practice to use powdered milk having a long shelf life to make milk in a liquid form. By adding water to a powdered formulation and applying agitation, one can quickly make milk in liquid form. This has the advantage of taking milk to locations which do not support storage of fresh milk; for example, on remote camping sites.

Milk in powdered form has been combined with other food products to create a "just add water" process for reconstitution of the food. Powdered chocolate milk is a quite popular drink whereby chocolate is combined with powdered milk. On introduction of water, the chocolate and milk form a liquid drink having milk in liquid form.

While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

It should be understood that all of the herein referenced materials provide considerable definition of some elements of the present invention. Therefore, those materials are incorporated herein by reference whereby the instant specification can rely upon them for enablement of the particular teachings of each.

SUMMARY OF THE INVENTION

A novel food cereal including articles of manufacture and methods of producing those articles is comprised of cereal pieces having a surface coating of milk.

Articles of manufacture of the invention include cereal which is finished with a special process to yield a final product of cereal coated with milk. On combination with water, cereals of the invention permit the surface coating to easily dissolve and produce milk in a liquid form. The milk coating dissolves and separates from the cereal and combines with the added water. Upon mixing with water, milk in a dried or powdered form becomes hydrated and converts to a liquid. The cereal having a coating of dry milk thereon, is stable with respect to structure and aging. It may be packaged in a usual fashion without necessity for modification to packaging materials.

Processes of the invention include processes which may be used to apply a dry milk power to cereal pieces. One preferred method includes slightly re-hydrating dried milk such that it becomes slightly sticky or glutinous and allowing it to dry while the milk is in contact with the cereal.

Alternatively, a fine mist of water may be applied to a cereal piece such that the exterior of the cereal piece becomes slightly moist. Dry milk may be then introduced and is brought into contact with the moist cereal exterior. As the combination is allowed to dry, milk particles bond to the cereal exterior to form a coating.

A contact bond is formed when the nature of the surface of cereal pieces causes milk product particulate to be affixed to the cereal surface via friction between those constituents or by mechanical interlocking between nooks, crannies and surface features with roughly shaped milk product particles.

A still further alternative includes using a sugar or sugar substitute as a binding agent to form a coating on cereal pieces

OBJECTIVES OF THE INVENTION

It is a primary object of the invention to provide a new food product.

It is an object of the invention to provide an easy to use cereal.

It is an object of the invention to provide cereal pieces with a coating on the exterior.

It is a further object to provide cereals with a coating of dry milk.

It is an object to provide processes for applying coatings of dry milk to the exterior surface of cereal pieces.

It is still further an object to provide a cereal with a coating of dry milk which may be disolved into a solution upon combination with water.

A better understanding can be had with reference to the detailed description of Preferred Embodiments. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

GLOSSARY

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. For purposes of this disclosure:

Milk

It would render this description awkward and difficult to read to replace the word 'milk' with the phrase 'milk, milk products, milk-like substances or milk alternates', for each occurrence herein, accordingly it will be understood that use of the term 'milk' means 'milk, milk products, milk-like substances or milk alternates' herein and throughout this specification and the claims appended hereto.

Milk products, milk-like substances or milk alternates may include at least: whey, whey protein concentrates, whey protein isolates, whey protein fractions, casein, caseinates, protein isolates, soy protein isolate, buttermilk, fractionate milkfat, and others Each of these may provide unique attributes and functionality to the instant invention and each are anticipated under the general term "milk". One will not successfully traverse the essence of this invention by substituting one substance for another as it is the performance and function of the combination which is the subject of this teaching and the appended claims, the performance and function being more or less independent of the exact material used as a coating.

Cereal

Wheat, corn, rice, oats, and barley are major ingredients used to make most cereals. In addition, one might find less common elements such as psyllium and bulgar wheat, flaxseed, sprouted grains, rice extract, among others. These fundamental element are generally processed by extruding, puffing, roasting, baking, et cetera. In addition, manufactures may add fruits such as raisins and dates, or nuts such as almonds and peanuts. Together, these elements make up common breakfast products called cereals. For purposes of this disclosure, cereal is meant to be inclusive of all the configurations which may be realized as a food product having a cereal as a base. Therefore, a coating which is applied to a "cereal" includes such coatings being applied to a food products having cereals as a foundation and additionally includes coatings applied to the secondary elements such as fruits and nuts as well.

PREFERRED EMBODIMENTS OF THE INVENTION

In accordance with each of the preferred embodiments of the invention, there is provided articles of manufacture and methods for producing cereal coated with dry milk It will be appreciated that each of the embodiments described include both articles of manufacture and methods and that the articles and methods of one preferred embodiment may be different than the articles and methods of another embodiment.

Modern lifestyles place a high demand on food products with respect to functionality. They must be highly nutritional while also being very convenient. Although, fast foods have a poor reputation for being unhealthful, they remain quite popular in our culture. This is partially due to the fact that we enjoy a very active lifestyle where 'eat and run' describes the nature of some meals. Now more than ever, a high demand is placed upon the health value of meals. Accordingly, cereal is regaining popularity. Cereal is a simple and healthy food which offers good foundation on which one might start the day.

Cereal is generally prepared by simply pouring into a bowl and combining it with milk. Milk softens the cereal and complements the flavors nicely with its creamy taste. However, since cereal is most generally accompanied by milk, the combination carries with it all disadvantages associated with the elements of the combination.

For example, milk must be kept cold so cereal tends to be consumed in proximity to a refrigerator. Without a refrigerator, one is left without milk and necessarily the combination of cereal and milk. While camping, it is better to rely on an alternative breakfast because milk is usually not available.

Milk cannot be found at the office. An office kitchen sometimes includes only bare necessities such as a coffee maker and perhaps a water dispenser, but generally not a refrigerator and therefor generally not milk. Where an office does maintain a refrigerator, that refrigerator is most likely to be shared by many persons who are unlikely to maintain the care, cleanliness and freshness necessary for proper storage of milk. While an aluminum can of Coke may survive a office refrigerator environment, a opened cardboard carton of milk is exposed to certain bacterium which tend to offend even the strongest of beings. Therefor milk is generally not present in the office and thus cereal is not consumed there.

Even at home where milk is generally kept, milk must be monitored for freshness. Milk tends to expire after a limit of time has passed and the milk goes sour. While not keeping a constant check, one might find milk in the home refrigerator to have gone bad unexpectedly. Where milk has gone bad, so has the combination of milk and cereal.

In some places, for example third world countries, refrigerators may not be found in every home. This may contribute to problems with general nutrition of people who live in those regions. Where certain foods are not readily available, people may tend to have a diet which does not include those foods even when they may be important to balanced nutrition. Increasing availability of some foods to poorer nations which are otherwise in short supply of these foods is also an benefit of this invention.

Accordingly, one might find many opportunities to have a desire for milk and cereal where it is prohibitively difficult to keep milk.

And so, Arthur A. Krause and Walter K. Lim, men of great genius apt to invent and discover ingenious things, come now with an invention they have discovered and devised to answer that need. By applying a special coating onto the surface of cereal pieces, a food product is created where one may just add water to the product and the result is a delicious cereal and milk combination. This is achieved via a process whereby the water interacts with the coated cereal pieces to dissolve the coating into solution thus forming milk.

Articles

Articles of manufacture of this invention includes articles comprising a combination of cereal pieces and a surface coating of milk on the cereal pieces.

Cereal pieces prepared in accordance with the invention are structurally stable an have a long shelf life. Since the milk applied to the surface has a low content of water, water does not migrate into the cereal pieces causing them to soften or otherwise become damaged structurally. Since powdered milk has an extremely long lifetime in comparison to fresh milk, the coated pieces of cereal are also stable in time giving the product a long shelf life.

Alternatively, articles of the invention may include cereal pieces having a surface coating of sugar and milk. The sugar operates as a binder to hold dry milk to cereal pieces.

Methods

Methods of forming a surface coating of milk in a dry state include at least the following:

In a first method, a coating of milk may be effected by forming cereal pieces in the usual manner, applying water to the outer surfaces of the pieces, and introducing dry powdered milk to the wetted surfaces. The powder milk then absorbs the water and becomes bound to the outside of the cereal pieces. On further drying, the milk remains affixed to the cereal pieces in a stable state having a long shelf life. The cereal pieces may be packaged normally and used by consumers who need only add water to form a milk-cereal combination.

In a second method, a dry or powdered milk is joined to the surface of cereal pieces via a sticky sugar coating. Cereal pieces normally processed can be improved by the application of sugar or honey to the outside surface. Prepared correctly, the sugar may leave the outside surface very sticky. This stickiness can be used as a binding agent for powdered milk which can applied to the sugar or honey coating. The function of the sugar improves the taste while binding milk to the cereal pieces prior to use. Again, water introduced to the cereal tends to dissolve the milk into a solution resulting in a preferred sweetened cereal-milk combination.

Powdered milk may be moistened with direct application of water thereto. Alternatively, milk may be in a form which is sticky and slightly moist, partially due to its fat content, whereby the natural stickiness of milk in this state can be used to bind it to the surfaces of cereal pieces. Milk in this state can be brought into contact with cereal pieces. After further baking off moisture from the milk, the result is dry milk being bound to the outside of cereal pieces.

One will now fully appreciate how a cereal may be combined with milk as a surface coating to form a stable product to which water may be added to form a delicious food product. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

As inventors and discovers of the novel invention, Arthur A. Krause and Walter K. Lim now claim as follows:

1. An article of manufacture comprising a combination of cereal pieces and a surface coating of dried milk product thereon said cereal pieces, said surface coating being affixed to said cereal pieces via a contact bond.

2. An article of claim 1, said surface coating being comprised of milk products.

3. An article of claim 1, said surface coating being comprised of artificial milk material.

4. An article of claim 1, said surface coating being comprised of milk alternates.

5. A method of applying a coating of dried milk product to a cereal piece comprising the step forming a contact bond between dried milk product and the surface of the cereal piece.

6. A method of claim 5, the method comprising the steps:
   wetting the surface of th cereal piece, and
   introducing dry milk powder to the wetted surface of the cereal piece.

7. A method of claim 5, the method comprising the steps:
   wetting the surface of the cereal piece, and
   introducing dry milk product powder to the wetted surface of the cereal piece.

8. A method of claim 5, the method comprising the steps:
   wetting the surface of the cereal piece, and
   introducing dry milk-like substance to the wetted surface of the cereal piece.

9. A method of claim 5, the method comprising the steps:
   wetting the surface of the cereal piece, and
   introducing dry milk alternates powder to the wetted surface of the cereal piece.

10. A method of claim 5, the method comprising the steps:
    hydrating a dry milk powder by adding water thereto;
    introducing said hydrated milk to the surface of the cereal piece; and
    drying the combination while the hydrated milk is in contact with the surface of the cereal piece whereby the milk binds to the surface of the cereal piece.

11. A method of claim 5, the method comprising the steps:
    hydrating a dry milk product powder by adding water thereto;
    introducing said hydrated milk product to the surface of the cereal piece; and
    drying the combination while the hydrated milk product is in contact with the surface of the cereal piece whereby the milk product binds to the surface of the cereal piece.

12. A method of claim 5, the method comprising the steps:
    hydrating a dry milk-like substance powder by adding water thereto;
    introducing said hydrated milk-like substance to the surface of the cereal piece; and
    drying the combination while the hydrated milk-like substance is in contact with the surface of the cereal piece whereby the milk-like substance binds to the surface of the cereal piece.

13. A method of claim 5, the method comprising the steps:
    hydrating a dry milk alternates powder by adding water thereto;
    introducing said hydrated milk alternates to the surface of the cereal piece; and
    drying the combination while the hydrated milk alternates is in contact with the surface of the cereal piece whereby the milk alternates binds to the surface of the cereal piece.

14. A method of claim 5, the method comprising the steps:

forming a milk paste bringing said milk into a tacky state by dehydration, introducing said milk paste to the surface of cereal pieces; and drying the combination while the milk paste is in contact with the surface of cereal pieces whereby milk binds to the surface of cereal pieces.

15. A method of claim 5, the method comprising the steps:

forming a milk product paste by bringing said milk product into a tacky state by dehydration, introducing said milk product paste to the surface of cereal pieces; and drying the combination while the milk paste is in contact with the surface of cereal pieces whereby milk product binds to the surface of cereal pieces.

16. A method of claim 5, the method comprising the steps:

forming a milk-like material paste by bringing said milk-like material into a tacky state by dehydration, introducing said milk-like material paste to the surface of cereal pieces; and drying the combination while the milk-like material paste is in contact with the surface of cereal pieces whereby milk-like material binds to the surface of cereal pieces.

17. A method of claim 5, the method comprising the steps:

forming a milk alternate paste by bringing said milk alternate into a tacky state by dehydration, introducing said milk alternate paste to the surface of cereal pieces; and drying the combination while the milk alternate paste is in contact with the surface of cereal pieces whereby milk alternate binds to the surface of cereal pieces.

18. An article of manufacture comprising a combination of cereal pieces and a surface coating of dried milk product thereon said cereal pieces, said surface coating forming a bond to said cereal pieces via contact.

19. An article of manufacture comprising a combination of cereal pieces and a surface coating of dried milk product thereon said cereal pieces, whereby the dried milk product is slightly re-hydrated such that it becomes slightly sticky or glutinous and allowed to dry while the dried milk product is in contact with the cereal.

20. A product by process comprising cereal having thereon a surface coating of dried milk product, said process comprising the steps:

applying a fine mist of water to a cereal piece such that the exterior of the cereal piece becomes slightly moist, introducing dry milk by bringing into contact with moistened cereal piece; and drying the combination, whereby the cereal piece which is surface coated with a milk product.

21. A product by process comprising cereal having thereon a surface coating of dried milk product said process comprising the steps:

slightly re-hydrating a dried milk product whereby it becomes sticky, bringing the slightly re-hydrated dried milk product into contact with a cereal piece, and drying the combination, whereby the cereal piece which is surface coated with a milk product.

22. An article of manufacture comprising a combination of cereal pieces and a surface coating of dried milk product thereon said cereal pieces, whereby said dried milk product adheres to said cereal pieces without sugar or adhesive used in combination with the surface coating of a dried milk product and cereal.

* * * * *